April 6, 1965  E. ZILLMER  3,176,579
HOUSING FOR PROJECTOR WITH MECHANICAL IMAGE SHIFTING DEVICE
Filed Nov. 22, 1960  2 Sheets-Sheet 1

INVENTOR
ERICH ZILLMER
BY
Blum, Moscovitz,
Friedman and Blum
ATTORNEYS.

April 6, 1965 E. ZILLMER 3,176,579
HOUSING FOR PROJECTOR WITH MECHANICAL IMAGE SHIFTING DEVICE
Filed Nov. 22, 1960 2 Sheets-Sheet 2

INVENTOR
ERICH ZILLMER
BY
ATTORNEYS.

United States Patent Office 3,176,579
Patented Apr. 6, 1965

3,176,579
HOUSING FOR PROJECTOR WITH MECHANICAL IMAGE SHIFTING DEVICE
Erich Zillmer, Braunschweig, Germany, assignor to Voigtlander A.G., Braunschweig, Germany, a corporation of Germany
Filed Nov. 22, 1960, Ser. No. 71,041
Claims priority, application Germany, Dec. 1, 1959, Z 7,690
2 Claims. (Cl. 88—28)

This invention relates to slide projectors and, more particularly, to a slide projector constructed and arranged so that an automatic actuator for the slide shifting mechanism may be selectively readily and easily mechanically and electrically coupled therewith.

Slide projectors are known in which a slide shifting device or slide changer is mechanically operated under the control of switches or the like which may be mounted on the housing of the projector proper or in a separate switch casing or control unit connected with the projector by means of a cable. By operating the switch buttons manually, the slide may be shifted as desired to move one slide out of operative relation with the optical system and to move another slide into operative relation with the optical system. By the term "optical system" is meant the usual lamp, reflector, and lens system, all arranged coaxially, whereby the image of the slide is projected onto a suitable screen.

Slide projectors are also known in which there is provided an automatic means for actuating the slide shifting device, this automatic means being either incorporated in the slide projector or provided as an auxiliary therefor. Such automatic actuating means may comprise, for example, time switches for periodically shifting the slides at predetermined time intervals through actuation of the electrical system of the slide shifter. The electrical control may be either direct or through the means of low voltage relays. Such automatic actuating means may also comprise receivers converting radio impulses, ultrasonic impulses, or the like into switching impulses for effecting changing of the slide. In addition, such automatic devices may include, for example, tranducers for converting mechanical, electrical, hydraulic, pneumatic, acoustic, or thermal impulses into operating or shifting impulses for the slide shifter or changer.

Where such automatic actuating devices or mechanisms are incorporated in the projector as an integral part thereof, the cost of the projector is very materially increased. Many purchasers of slide projectors will have no need for such automatic actuating mechanism. However, if a slide projector is purchased without such automatic mechanism, and it is later desired to install an automatic slide changer actuating mechanism into the projector, the cost is very considerable. Furthermore, where the automatic mechanism is in the form of an auxiliary switching unit arranged to be selectively mounted externally on the projector or its housing, it is necessary to dismount the automatic mechanism from the projector and to store it in a separate case when the projector is not in use, or when the projector is transported or stored in a suitable container.

In accordance with the present invention, the foregoing disadvantages are obviated by providing a projector, of the type equipped with an electro-mechanically operated slide shifter, with means whereby an automatic actuating mechanism for the slide shifter may be readily disengageably mechanically and electrically coupled to the projector without any difficulty. The automatic switching mechanism is provided with contacts or the like for cutting into the triggering or operating circuit of the slide shifter. Furthermore, the automatic shifting mechanism may include time switches, relays, radio receivers, or the mentioned transducers. With an arrangement of this type, the owner can obtain, subsequent to his purchase of the projector, the additional unit comprising the automatic actuating mechanism and connect it without any difficulty to the projector. The automatic mechanism, when coupled to the projector, does not project substantially beyond the overall outline of the projector.

In accordance with one embodiment of the invention, the projector housing is provided with an outwardly opening recess for selecively accommodating the automatic switching mechanism. Preferably, such recess is provided in the base or bottom wall of the projector housing. However, it is also within the scope of the invention to provide the space for accommodating the automatic switching mechanism within the projector housing and in such a manner that the accommodating space is accessible only when the projector housing is opened. In this latter case, openings are provided in a wall of the projector housing for projection of a setting element of the automatic switching mechanism.

For an understanding of the principles of the invention, reference is made to the following description of typical embodiments thereof as illustrated in the accompanying drawings. In the drawings.

Figure 1:
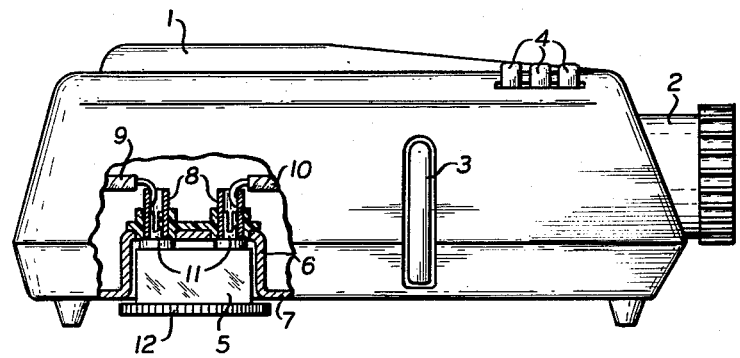
FIG. 1 is a side elevational view, partly broken away, of one embodiment of a slide projector incorporating the invention, and showing an automatic switching mechanism mounted therein.

Referring to the drawings, the projector is indicated at 1 as provided with an objective lens system 2 and a slide shifting device or slide changer 3 which is mounted in the projector for reciprocation across the optical axis thereof. Keys or switch push buttons 4 project from the housing and control the movement of the carriage 3 for shifting the slides, the keys 4 being manually operated each time a slide is to be changed. One of the keys 4 must be actuated for each shifting of a slide.

Such manual operation of the slide shifter can be obviated, and the slide shifted automatically, when a known type of automatic actuating mechanism for the slide shifter is provided. Such an automatic mechanism is illustrated at 5 and may be operated either automatically in a predetermined time sequence or, for example, by remote control.

The automatic mechanism 5 is contained in a suitable casing which conformingly seats in an outwardly opening recess 6 in the base 7 of the housing of the projector. The recess 6 preferably opens downwardly.

In the arrangement shown in FIG. 1, two female receptacles or sockets 8 are mounted in the inner wall of the recess, and are electrically connected to cables 9 and 10 cut into the electrical circuit for operating the slide shifter 3. The automatic switch mechanism 5 has two male connecting elements or plugs 11 arranged to have electrical and mechanical cooperation with the female connectors or sockets 8, thus establishing an electrical connection between the automatic actuating mechanism 5 and the control circuit for operating the slide shifter 3. in effect, the engagement of plugs or pins 11 in sockets 8 cuts the automatic mechanism 5 into the control circuit for effecting operation of the slide shifter 3.

The receptacles 8 and male connectors 11 also have the function of mechanically securing the mechanism 5 to the projector 1. As can be best seen in FIG. 3, they are offset laterally, or are asymmetrical with respect to the center of the recess 6 and with respect to the center of the mechanism 5, in such a manner that the mechanism 5 can be coupled to the projector in only a single position.

Figure 3:
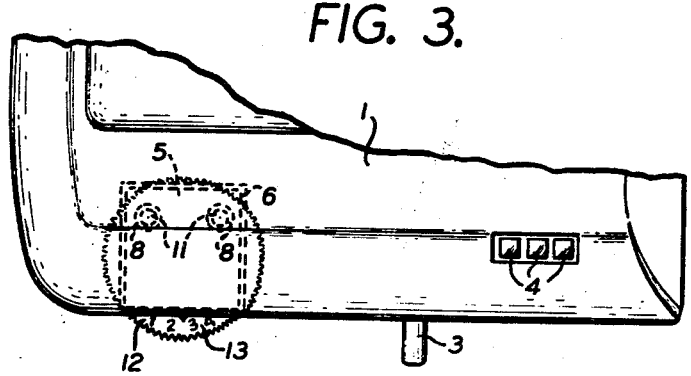
FIG. 3 is a partial plan view of a projector embodying the invention and with the automatic switching mechanism coupled thereto.

The automatic actuating mechanism 5 is provided with an adjustable knurled disk 12 provided with a scale 13 (FIG. 3) which may cooperate with a fixed reference point on the casing or on the mechanism 5. By means of the disk 12, the mechanism 5 is set in such a manner that it will provide operating pulses for actuating the slide shifter 3 at predetermined intervals. The knurled disk 12, as best seen in FIG. 3, projects beyond the periphery of the housing 1 so that it may be easily read and easily actuated.

Figure 2:
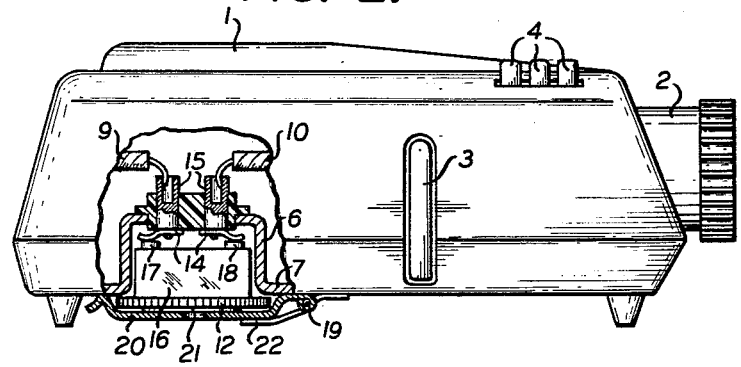
FIG. 2 is a view similar to FIG. 1 illustrating another modification of the invention.

In the arrangement of FIG. 2, the projector 1 is again provided with an outwardly opening recess 6 in a base wall 7. In this particular case, the recess 6 is provided with contact springs 14 electrically and mechanically connected to bushings 15 in turn connected with cables 9 and 10. The automatic slide shifter actuating mechanism 16, which is disengageably seated in conforming relation in the recess 6, carries two contacts 17 and 18 which are arranged to engage the respective contact springs 14. Firm engagement between the springs 14 and the contacts 17, 18 is provided by means of a lid or cover 20 which is hinged, as at 19, to the base of the housing. This lid 20 has a contact portion 21 arranged to engage the actuating mechanism 16, and is biased into holding engagement with the mechanism 16 by means of a spring 22. In this case also, the mechanism 16 is provided with a knurled disk 12 for setting the desired time interval for operation of the mechanism 16.

Figure 4:
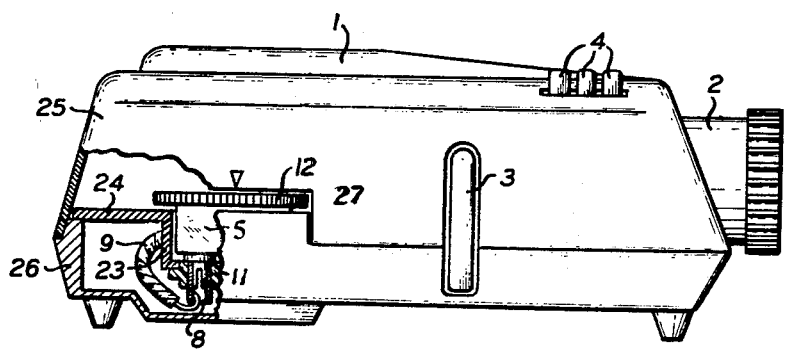
FIG. 4 is a view similar to FIGS. 1 and 2 illustrating still another embodiment of a projector incorporating the invention.

In the embodiment of FIG. 4, the projector 1 is again provided with an objective 2, a slide shift carriage 3, and switch keys 4. The automatic slide shift actuating mechanism 5 corresponds to that shown in FIG. 1 but, in this case, is fitted inside of the housing of the projector. It is provided with male connector elements, such as 10, 11, which engage female connector elements, such as sockets 8, mounted in the projector. In this embodiment of the invention, the outwardly opening recess 23, which conformingly receives the mechanism 5, is formed in a partition or wall 24 in the projector 1. Access to recess 23 can be had only when the hood or cover 25 of the projector housing 1 is disengaged from the base 26 or opened. Hood 25 has a notch or opening 27 through which the knurled disk 12 for setting the mechanism 5 can project for easy reading and actuation.

It will be understood that the mechanisms 5 and 16 illustrated in the drawing are shown only by way of example, and other automatic actuating means for the slide shifter can be mounted in the recesses of the projector, these mechanisms being controlled or actuated in any desired manner and controlling various functions of the projector.

While specific embodiments of the invention have been shown and described in detail to illustrate the application of the principles of the invention, it will be understood that the invention may be embodied otherwise without departing from such principles.

What is claimed is:

1. In a slide projector provided with a reciprocable slide shifter and including an electrical control circuit for effecting reciprocation of said slide shifter, the improvement comprising a housing for the projector formed with a space for receiving an automatic actuating mechanism for the slide shifter; a pair of electrical connectors extending into said space and connected in the control circuit; said electrical connectors being adapted to have mating engagement with corresponding electrical connectors on the automatic actuating mechanism for electrically connecting said mechanism into the control circuit; said space comprising a recess opening outwardly of a wall of the housing; a cover secured to the wall having said recess therein and normally closing said recess; means biasing said cover to the closed position; and means on said cover engageable with the mechanism to retain the same in operative relation in its receiving recess.

2. A projector housing as claimed claim 1 in which one pair of electrical connectors comprises spring contacts and the other pair of electrical connectors comprises fixed contacts arranged to engage said spring contacts; said cover maintaining said contacts engaged by virtue of being biased to the recess closing position and engaging said automatic mechanism.

References Cited by the Examiner

UNITED STATES PATENTS

| | | | |
|---|---|---|---|
| 1,938,309 | 12/33 | Williams | 174—55 |
| 2,503,239 | 4/50 | Antos | 88—28 |
| 2,530,945 | 11/50 | Chapman et al. | 174—59 X |
| 2,537,429 | 1/51 | Seyler | 88—28 |
| 2,581,308 | 1/52 | Smith | 200—133 X |
| 2,903,539 | 9/59 | Matthysse et al. | 200—115.5 X |
| 2,906,168 | 9/59 | Schlafly | 88—28 |

NORTON ANSHER, *Primary Examiner.*

EMIL G. ANDERSON, G. Y. CUSTER, *Examiners.*